(12) United States Patent
Novek

(10) Patent No.: US 9,039,326 B1
(45) Date of Patent: May 26, 2015

(54) TIDAL POWER SYSTEM AND METHODS

(71) Applicant: Ethan Novek, Greenwich, CT (US)

(72) Inventor: Ethan Novek, Greenwich, CT (US)

(*) Notice: Subject to any disclaimer, the term of this patent is extended or adjusted under 35 U.S.C. 154(b) by 0 days.

(21) Appl. No.: 14/474,654

(22) Filed: Sep. 2, 2014

(51) Int. Cl.
  *E02B 9/08* (2006.01)
  *F03B 13/26* (2006.01)

(52) U.S. Cl.
  CPC ............ *F03B 13/264* (2013.01); *E02B 9/08* (2013.01); *Y02E 10/38* (2013.01)

(58) Field of Classification Search
  CPC ............ E02B 9/08; Y02E 10/28; Y02E 10/38
  USPC ............ 405/75, 76; 290/42, 43, 53, 54
  See application file for complete search history.

(56) References Cited

U.S. PATENT DOCUMENTS

| | | | |
|---|---|---|---|
| 1,294,808 A * | 2/1919 | Jenkins | 405/76 |
| 3,754,147 A * | 8/1973 | Hancock et al. | 290/53 |
| 4,374,008 A | 2/1983 | Natansohn et al. | |
| 4,645,377 A * | 2/1987 | Vesterby | 405/74 |
| 7,257,946 B2 * | 8/2007 | Welch, Jr. | 290/53 |
| 7,331,174 B2 * | 2/2008 | Welch et al. | 290/53 |
| 7,554,143 B2 | 6/2009 | Lim | |
| 8,215,104 B2 * | 7/2012 | Riley | 290/54 |
| 8,643,206 B2 * | 2/2014 | Ekern | 405/76 |
| 2006/0233613 A1 * | 10/2006 | Welch et al. | 405/76 |
| 2007/0258771 A1 * | 11/2007 | Weldon | 405/76 |
| 2010/0077749 A1 * | 4/2010 | Riley | 290/52 |
| 2010/0269929 A1 * | 10/2010 | Dodds | 290/54 |

FOREIGN PATENT DOCUMENTS

JP  61169674 A * 7/1986 ............ F03B 13/00

* cited by examiner

*Primary Examiner* — Frederick L Lagman
(74) *Attorney, Agent, or Firm* — Gregory L. Porter; Andrews Kurth LLP

(57) ABSTRACT

The present invention pertains to a new method and system for producing electricity from tidal energy. In one embodiment the system employs at least one underground region for collecting water percolating at a higher tide level and at least another underground region capable of fluid communication with the first underground region. The system is configured to release water at separate times from the underground regions to operate hydro turbines and generators to produce electricity.

28 Claims, 5 Drawing Sheets

TIDAL POWER SYSTEM AND METHODS

FIELD OF THE INVENTION

Embodiments disclosed herein relate to a power system operated by changing water levels, e.g., tidal, and related methods.

BACKGROUND AND SUMMARY OF THE INVENTION

Although not yet widely used, generating power from changing water levels such as tides has potential for future electricity generation. Tides are more predictable than both wind energy and solar power. What is needed then are effective, lower cost tidal power electrical generating systems and methods.

Advantageously, the present invention pertains to efficient and cost-effective new methods and systems for generating power from tidal energy. In one embodiment, a hydropower generation method utilizes changing water levels. The method comprises collecting water percolating through a permeable substance into a first underground region as a water level is increased. The collected water is released from the first underground region into a second underground region. In this manner a first hydro turbine and generator operatively coupled therebetween can generate power. Water may be released from the second underground region as water level is decreased. This can operate a second hydro turbine and generator operatively coupled therebetween to also generate power.

In another embodiment the present invention pertains to a tidal power system. The system comprises a first underground region for collecting water percolating through a coastal area medium at a higher tide level and a second underground region capable of fluid communication with the first underground region. Water is released from the first underground region to the second underground region through an inflow pipe. The inflow pipe further comprises a first hydro turbine and generator operatively coupled thereto to generate power. The system has an outflow pipe through which water is released from the second underground region. The outflow pipe further comprises a second hydro turbine and generator operatively coupled thereto to generate power. The system is configured to release water at separate times from the first underground region and the second underground regions to operate the hydro turbines and generators and thereby produce electricity.

DETAILED DESCRIPTION

Figure 1:
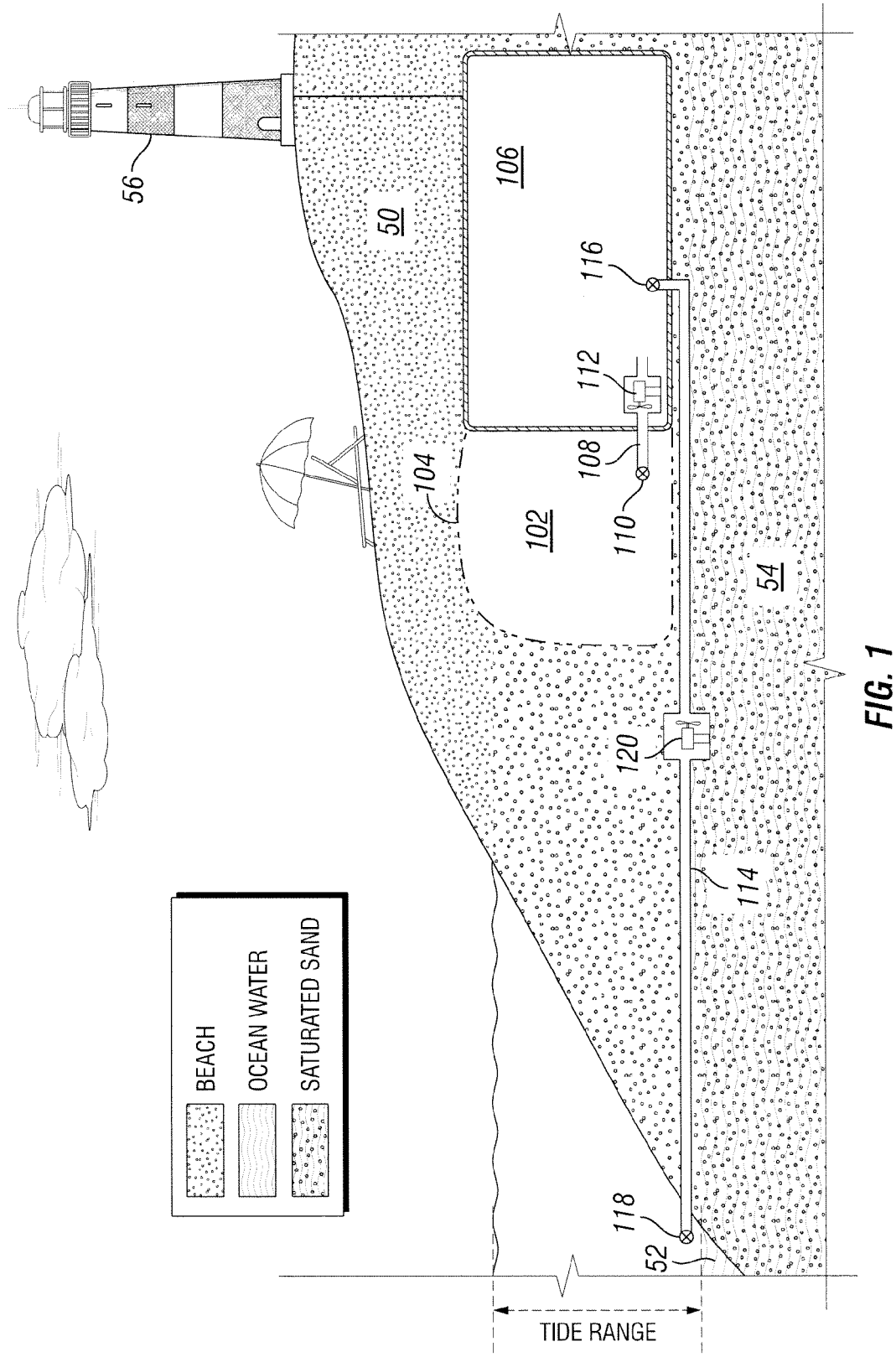
FIG. 1 illustrates an embodiment of a tidal power system.

A power system and method is disclosed. The power system and method may be configured to effectively capture energy from changing water levels such as tides using water percolation through a permeable substance. The specific permeable substance is not particularly important so long as water is capable of being collected through it. Examples of permeable substances include those substances often found on or near coastal waters or beaches. For example, the permeable substance may comprise sand, gravel, rock, and mixtures thereof. In this manner as tides vary between, for example, a low tide and a high tide power may be generated.

In one embodiment a tidal power system may include two parts: at least one seepage region and at least one water storage region. The invention is described herein with respect to one seepage region and one water storage region. However, if desired the system may include two, three, or even four or more seepage regions. Similarly, the system may include two, three, or even four or more water storage regions coupled to the one or more seepage regions. In addition, two or more systems may be coupled together. In this manner, if desired the systems may share a power storage, transmission, and/or distribution system.

The seepage region may be constructed in any convenient manner which manner may differ depending upon, for example, the specific application, available materials, and other components. Generally, the seepage region may comprise an underground region or space which may have one or more structured supports. If desired, the seepage region may employ a filter-like material configured to, for example, block a majority of sand, dirt and other undesirable materials while allowing water to infiltrate the space as it percolates through a permeable substance, e.g., sand, on or near the coastal water. The specific filter-like material to be employed is not particularly critical and, if employed, it may conveniently be selected from a mesh, screen, net, or some combination thereof.

In practice, the water level of the collected water in the seepage region varies by application. In some embodiments the water level generally corresponds with current tide levels. In this manner the collected water may serve as the water source for the tidal power system and hydraulic head during power generation.

The water storage region, like the seepage region, may be constructed in any convenient manner which manner may differ depending upon, for example, the specific application, available materials, and other components. Generally, the water storage region is near the seepage region and located at a similar elevation. The elevation of both regions is generally at or near sea level. The water storage region usually comprises a space or tank that is substantially sealed off or insulated from undesired water infiltration through percolation or otherwise. In practice water may enter the water storage region at a desired time when a water inflow pipe or other connection is opened between the seepage region and the water storage region. For efficiency, the desired time to open the connection to release at least a partial amount up to all of the water may be at or near high tide and/or sometimes during absolute high tide.

As the water storage region fills, water may travel through the water inflow pipe and, if desired, operates a hydro turbine and generator operatively coupled to the water inflow pipe. The type of hydro turbine and generator are not particularly critical and may be selected from any of those known or hereinafter discovered. Generally, the water flow encounters and rotates one more turbines comprising one or more blades, which in turn, rotates a shaft member of a generator for generating electricity.

Once the water storage region is filled to its desired capacity, the water is held in the storage region until it is desired to be released. For efficiency, at least a partial amount up to all of the water may be released at or near low tide and/or sometimes during absolute low tide. When the outflow pipe is opened, water flows out of the water storage region, usually directly into the local body of water adjacent the system. Advantageously, at least some up to all of the water flowing from the water storage region through the outflow pipe may be used to operate a hydro turbine and generator operatively coupled to the water outflow pipe. Generally, the water flow encounters and rotates one or more turbines comprising one or more blades, which in turn rotates a shaft member of a generator for generating electricity.

FIG. 1 illustrates an embodiment of a tidal power system. The tidal power system may be installed in a coastal beach 50 or any other location bordering a body of water 52 experiencing tides or similar water energy. A deeper portion of the beach 50 may be sand 54 that is constantly saturated with water ("saturated sand"), and which generally corresponds with low tide levels. The tidal power system may be positioned at a level in the beach 50 just at or above the saturated sand 54. The tidal power system includes a seepage region 102 for collecting water percolating through the beach 50. The seepage region 102 may be an underground space of any suitable size, dimension, or shape within the beach 50. In one embodiment, the seepage region 102 may be enclosed by wire or plastic mesh or screen, which effectively defines the seepage region 102. The mesh or screen may completely or partially enclose the seepage region 102. Any available mesh or screen sizes may be used which are suitable for blocking and preventing a deleterious amount of dirt or sand or other unwanted particles or objects from entering the seepage region while still allowing water to enter the seepage region. The tidal power system further includes a water storage region 106.

In one embodiment, the water storage region 106 may be a storage tank or any type of enclosure that is sealed off from any unwanted water infiltration. The water storage region 106 may be an suitable size or shape. The water storage region 106 may be positioned directly adjacent the seepage region 102, or at a suitable distance from the seepage region 102.

The tidal power system includes an inflow pipe 108 of any suitable size or type that allows fluid communication between the seepage region 102 and the water storage region 106. The inflow pipe 108 may be disposed as low as possible near a bottom of the seepage region 102 and water storage region 106. In this manner any use of the hydraulic head when the seepage region is filled may be maximized as will be explained below.

The inflow pipe 108 may include one or more pipe valves 110 of any type configured to control fluid communication between the seepage region 102 and the water storage region 106. The pipe valves may be manually or automatically operated, including but not limited to, electrically, hydraulically, or pneumatically. The tidal power system further includes an inflow hydro turbine and generator 112 which is operated by flow of water from the seepage region 102 to the water storage region 106 as described below.

The tidal power system further includes an outflow pipe 114 of any suitable size or type that allows fluid communication between the water storage region 106 and a body of water 52. The outflow pipe 114 may be disposed as low as possible near a bottom of the water storage region 106. The outflow pipe 114 includes a first pipe valve 116 of any type disposed at a first end or near the water storage tank 106, and a second pipe valve 118 of any type disposed at a second or distal end of the outflow pipe 114. The pipe valves may be manually or automatically operated, including but not limited to, electrically, hydraulically, or pneumatically. The outflow pipe 114 further includes a hydro turbine and generator 120 which is operated by flow of water from the water storage region 106 to the body of water 52 as described below.

Figure 2:
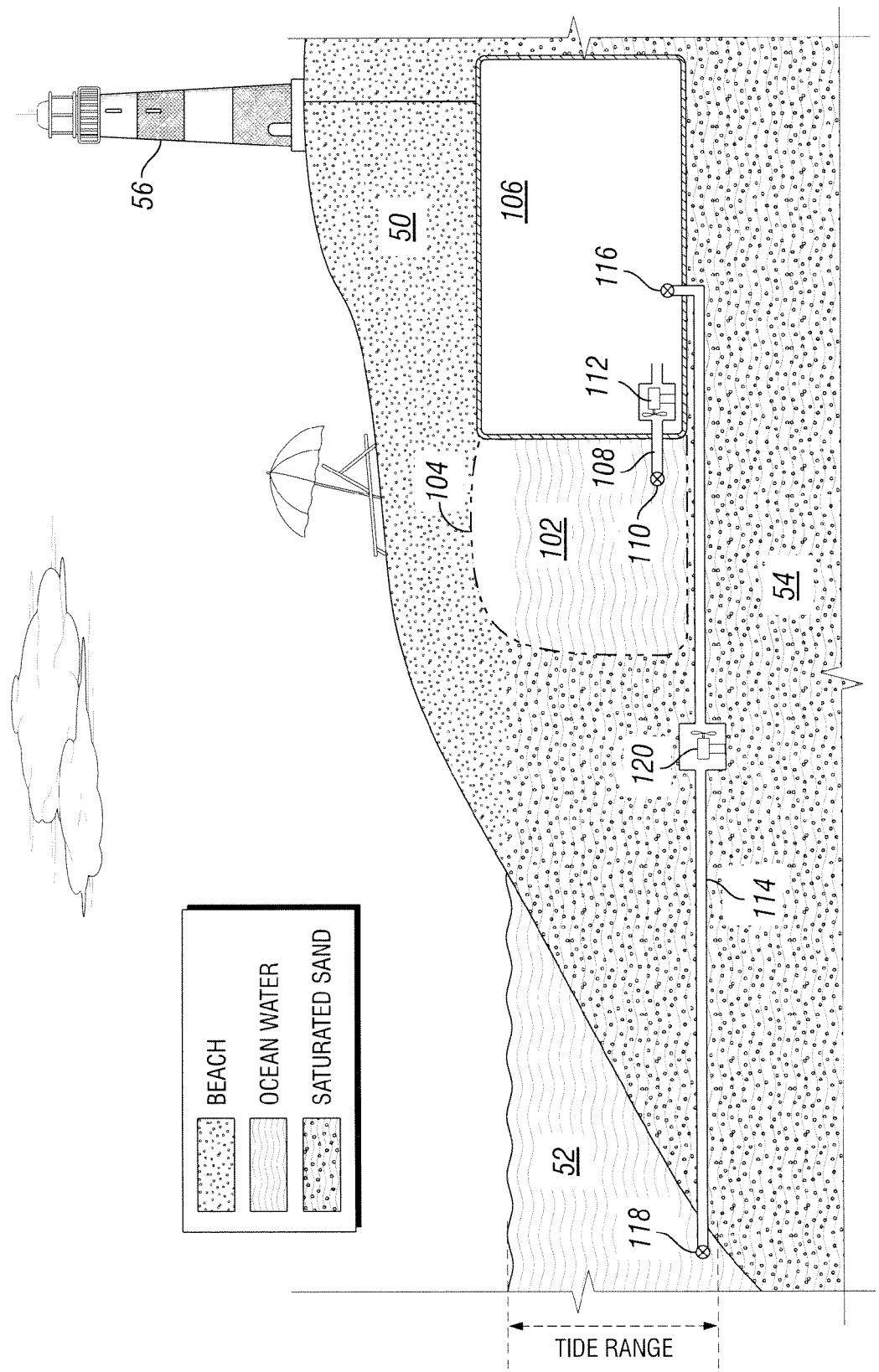
FIG. 2 illustrates filling a seepage region of the tidal power system at or near high tide.

Methods of using the tidal power system are described as follows in accordance with FIGS. 2-5. FIG. 2 illustrates a current tide level higher than low tide (e.g., at or near high tide). Pipe valves of the outflow pipe 114, particularly distal pipe valve 118, are closed to prevent water from entering the outflow pipe 114. A pipe valve 110 in the inflow pipe 112 is closed to prevent water from entering the water storage region 106. Water percolating through the porous material of the beach passes through mesh or screen layer and is collected in the seepage region 102. Water continues to collect in the seepage region 102 until a water level within the seepage region 102 is substantially equal to the current tide level.

Figure 3:
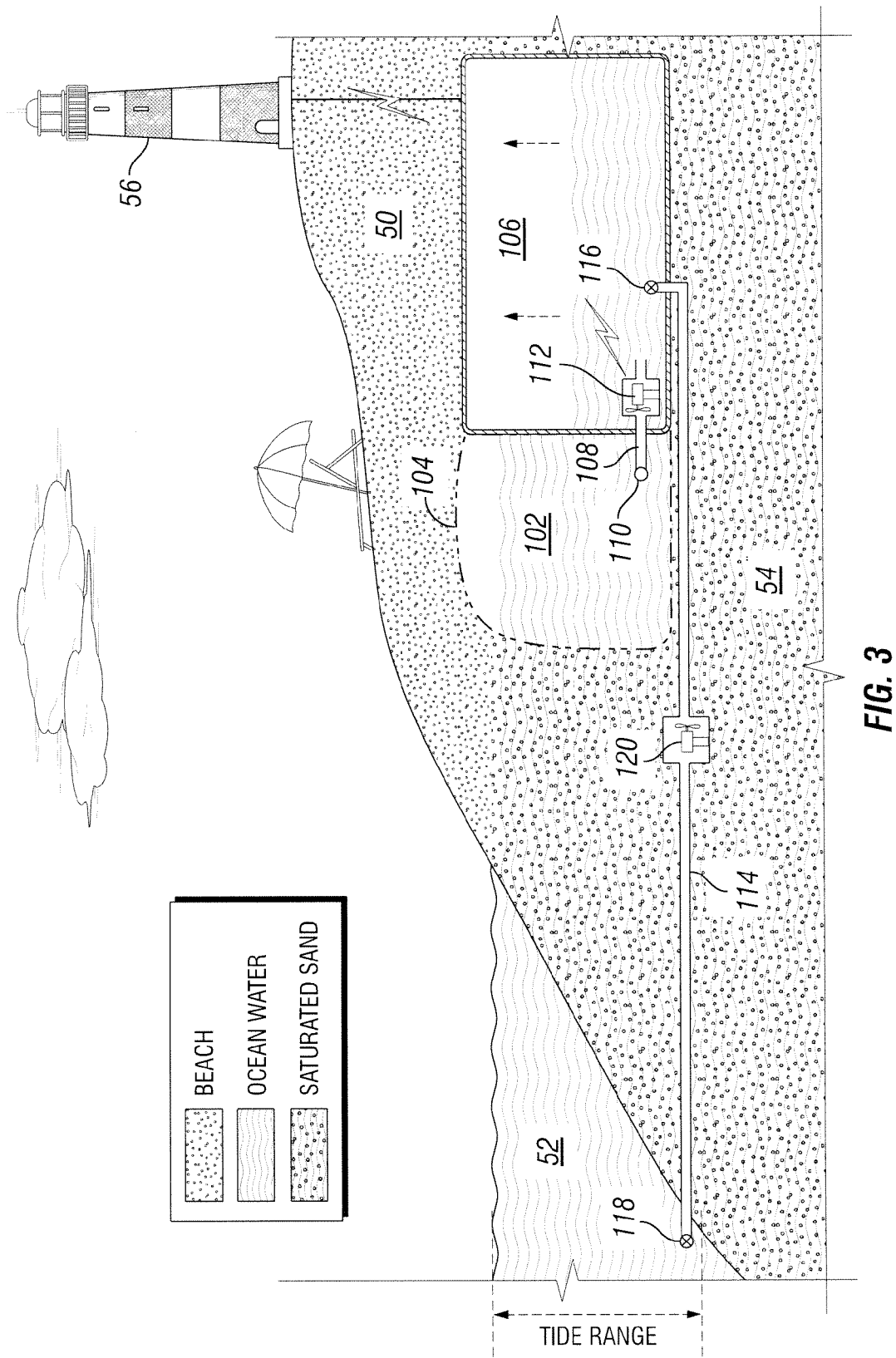
FIG. 3 illustrates a power generating state of the tidal power system at or near high tide.

FIG. 3 illustrates a power generating state of the tidal power system, that is, a height differential exists between the tide level and corresponding water level in the seepage region 102, and water level (or lack thereof) in the water storage region 106. In a first electrical generation stage, water is released or transferred from the seepage region 102 to the water storage region 106. At or near high tide, sometimes absolute high tide, the pipe valve 110 in the inflow pipe 108 is opened (outflow pipe valve 116 remains closed), and the water storage region 106 is filled with water from the seepage region 102 through the inflow pipe 108 until water levels between the two regions are substantially equal. Water release from the seepage region to the water storage region operates the hydro turbine and generator 112 operatively coupled to the inflow pipe, which generates electricity. FIG. 3 illustrates a lighthouse 56 being powered by electricity generated by the generator 112 during the first electrical generation stage. However, electricity generated may be stored locally and/or transmitted to any device or location needing electricity, whether for consumption or storage.

Figure 4:
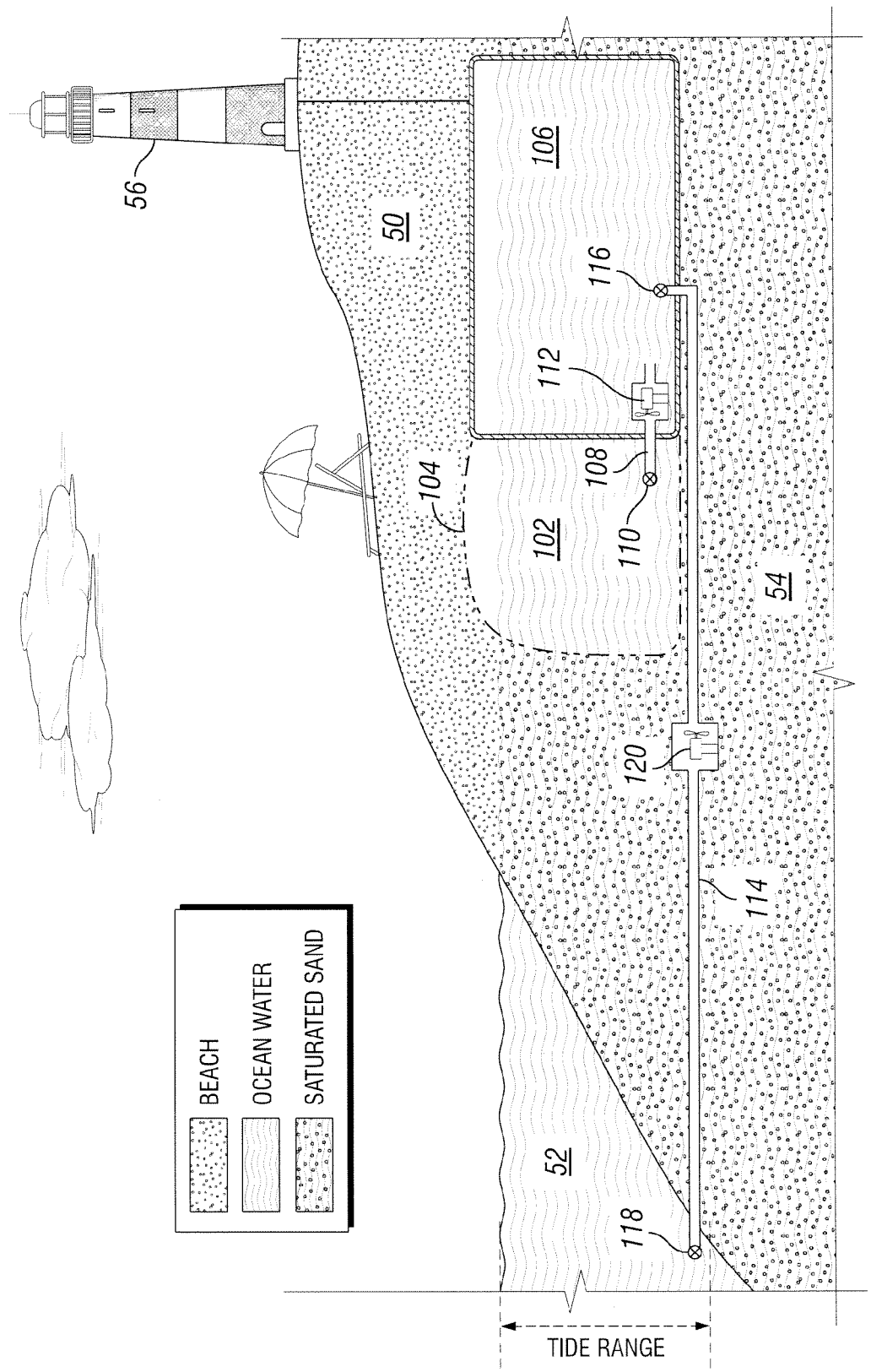
FIG. 4 illustrates a steady state of the tidal power system.

FIG. 4 illustrates a steady state of the tidal power system in which no electricity is being generated. That is, there is substantially no water level difference between the seepage region 102 and the water storage tank 106, and therefore there is little or no potential energy to drive water flow between the two regions. However, the water storage region 106 is filled with water in anticipation of a low tide when electricity may again be generated as described below.

Figure 5:
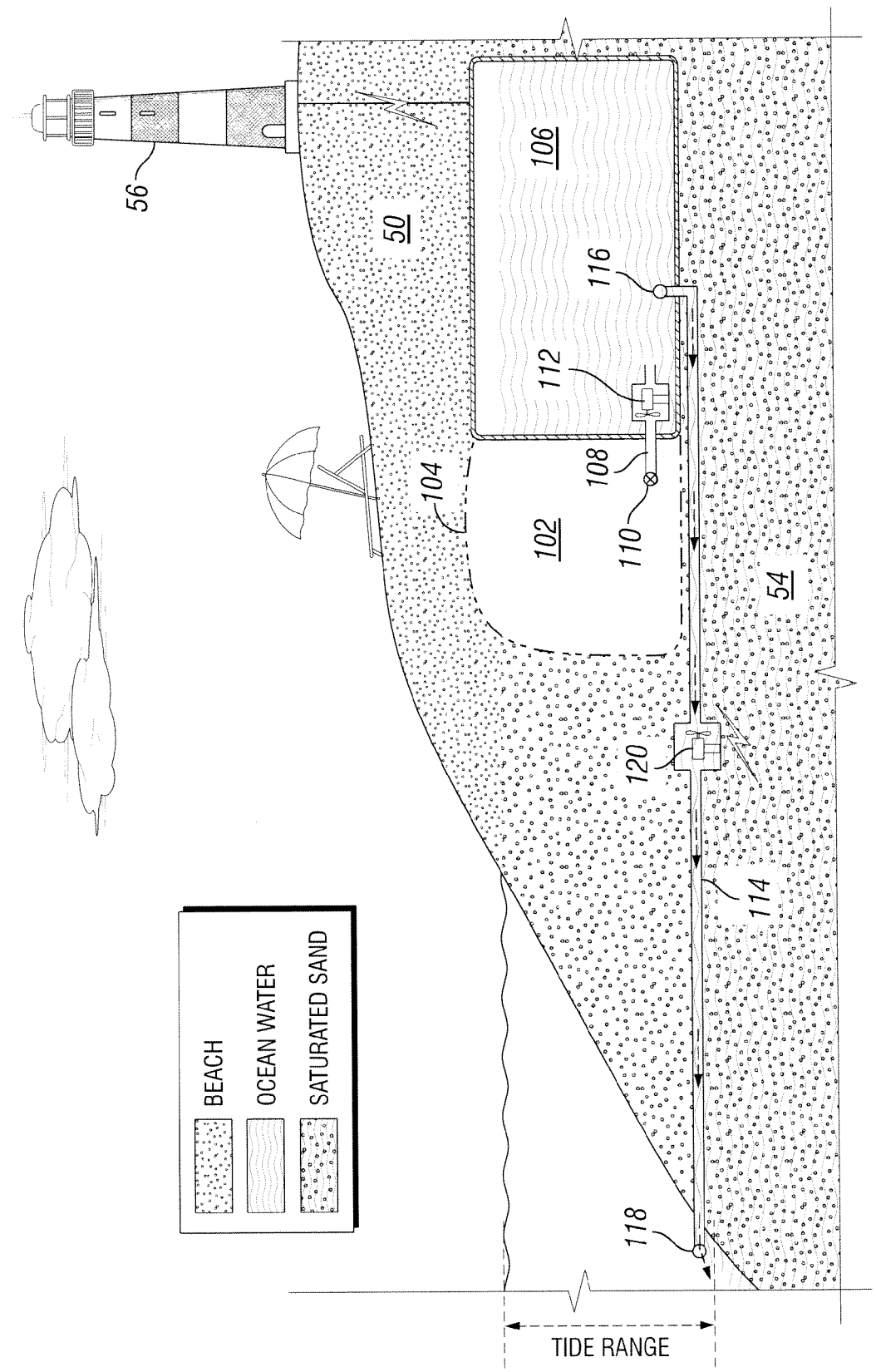
FIG. 5 illustrates a power generating state of the tidal power system at or near low tide.

FIG. 5 illustrates a power generating state of the tidal power system, that is, a height differential exists between the water level in the water storage region 106 and the tide level, which is at or near low tide. In a second electrical generation stage, water is released from the water storage region 106. At or near low tide, or sometimes absolute low tide, outflow pipe valves 116, 118 are opened, and water is released from the water storage region 106 through the outflow pipe 114. Generally, water released from the water storage region 106 through the outflow pipe 114 flows directly into the local body of water adjacent to the beach, which is at a lower tide. Water release from the water storage region 106 through the outflow pipe 114 operates the hydro turbine and generator 120 coupled to the outflow pipe, which generates electricity. FIG. 5 again illustrates a lighthouse 56 being powered by electricity generated by the generator 112 during the second electrical generation stage. However, electricity generated may be stored locally and/or transmitted to any device or location needing electricity, whether for consumption or storage. In one embodiment, electricity generated during the first and second electrical generation stages may be transmitted to different locations or devices.

Advantageously, the tidal power system disclosed has little to no interaction with marine life, does not substantially interfere with established and/or navigable waterways, and generally does not come into contact with most floating debris. Moreover, the tidal power system is underground and mostly hidden from sight by land and water. Still further, the tidal power system may have the potential to reduce seepage-induced erosion of coastal beaches. These advantages and more will be apparent to the skilled person upon reading the instant specification.

The claimed subject matter is not to be limited in scope by the specific embodiments described herein. Indeed, various modifications of the invention in addition to those described herein will become apparent to those skilled in the art from the foregoing description. Such modifications are intended to fall within the scope of the appended claims.

What is claimed is:

1. A hydropower generation method utilizing changing water levels, the method comprising:
   collecting water percolating through a permeable substance into a first underground region as a water level is increased;
   releasing water from the first underground region into a second underground region, and thereby operating a first hydro turbine and generator operatively coupled therebetween to generate power; and
   releasing water from the second underground region as a water level is decreased, and thereby operating a second hydro turbine and generator operatively coupled therebetween to generate power; wherein the method is characterized by (1) wherein the permeable substance comprises a beach; or (2) wherein the changing water levels are due to a tide; or (3) both.

2. The method of claim 1 wherein the permeable substance comprises sand, gravel, rock, and mixtures thereof.

3. The method of claim 1 wherein the permeable substance comprises a beach.

4. The method of claim 1 wherein the changing water levels are due to a tide.

5. The method of claim 4 wherein the first underground region is located at substantially the same elevation as the second underground region and wherein water is collected in the first underground region to a level up to about a high tide level.

6. The method of claim 4 wherein the first underground region is located at substantially the same elevation as the second underground region and wherein water is released from the second underground region at or about low tide.

7. The method of claim 1, further comprising releasing water from the first underground region into the second underground region through an inflow pipe.

8. The method of claim 7, further comprising opening one or more pipe valves in the inflow pipe at an increased water level.

9. The method of claim 1, further comprising releasing water from the second underground region to a decreased water level through an outflow pipe.

10. The method of claim 9, further comprising opening one or more pipe valves in the outflow pipe at the lower water level.

11. The method of claim 1, further comprising closing one or more pipe valves in the inflow and outflow pipes while collecting percolating water in the first underground region.

12. The method of claim 1, further comprising storing or transmitting at least a portion of any power generated.

13. A tidal power system comprising:
    a first underground region for collecting water percolating through a coastal area medium at a higher tide level;
    a second underground region capable of fluid communication with the first underground region;
    an inflow pipe through which water is released from the first underground region to the second underground region, the inflow pipe further comprising a first hydro turbine and generator operatively coupled thereto to generate power; and
    an outflow pipe through which water is released from the second underground region, the outflow pipe further comprising a second hydro turbine and generator operatively coupled thereto to generate power;
    wherein the system is configured to release water at separate times from the first underground region and the second underground regions to operate the hydro turbines and generators and thereby produce electricity and wherein the system is characterized by (1) the first underground region comprising a mesh or screen for filtering water percolating through the coastal area medium; or (2) the second underground region being insulated from water infiltration through the coastal area medium; or (3) both.

14. The system of claim 13, wherein the first underground region further comprises a mesh or screen for filtering water percolating through the coastal area medium.

15. The system of claim 13, further comprising one or more pipe valves in the inflow pipe configured to allow release of water from the first underground region to the second underground region.

16. The system of claim 13, further comprising one or more pipe valves in the outflow pipe configured to allow release of water from the second underground region.

17. The system of claim 13, wherein the second underground region is insulated from water infiltration through the coastal area medium.

18. The system of claim 13, further comprising an operable connection to an apparatus configured to use produced electricity.

19. A hydropower generation method utilizing changing water levels, the method comprising:
    collecting water percolating through a permeable substance into a first underground region as a water level is increased;
    releasing water from the first underground region into a second underground region, and thereby operating a first hydro turbine and generator operatively coupled therebetween to generate power; and
    releasing water from the second underground region as a water level is decreased, and thereby operating a second hydro turbine and generator operatively coupled therebetween to generate power which method comprises providing a filter around at least a portion of the first underground region for filtering water.

20. The method of claim 19, wherein the filter comprises a material selected from a mesh, screen, net, or combination thereof.

21. The method of claim 19, wherein the permeable substance comprises a beach.

22. The method of claim 19 wherein the changing water levels are due to a tide.

23. The method of claim 22 wherein the first underground region is located at substantially the same elevation as the second underground region and wherein water is collected in the first underground region to a level up to about a high tide level.

24. The method of claim 22 wherein the first underground region is located at substantially the same elevation as the second underground region and wherein water is released from the second underground region at or about low tide.

25. The method of claim 19, further comprising releasing water from the first underground region into the second underground region through an inflow pipe.

26. The method of claim 25, further comprising opening one or more pipe valves in the inflow pipe at an increased water level.

27. The method of claim 19, further comprising releasing water from the second underground region to a decreased water level through an outflow pipe.

28. The method of claim 27, further comprising opening one or more pipe valves in the outflow pipe at the lower water level.

\* \* \* \* \*